E. E. GAINER.
ICE MAKING APPARATUS.
APPLICATION FILED JUNE 13, 1912. RENEWED SEPT. 12, 1914.

1,157,623.

Patented Oct. 19, 1915.
3 SHEETS—SHEET 1.

E. E. GAINER.
ICE MAKING APPARATUS.
APPLICATION FILED JUNE 13, 1912. RENEWED SEPT. 12, 1914.
1,157,623.
Patented Oct. 19, 1915.
3 SHEETS—SHEET 2.
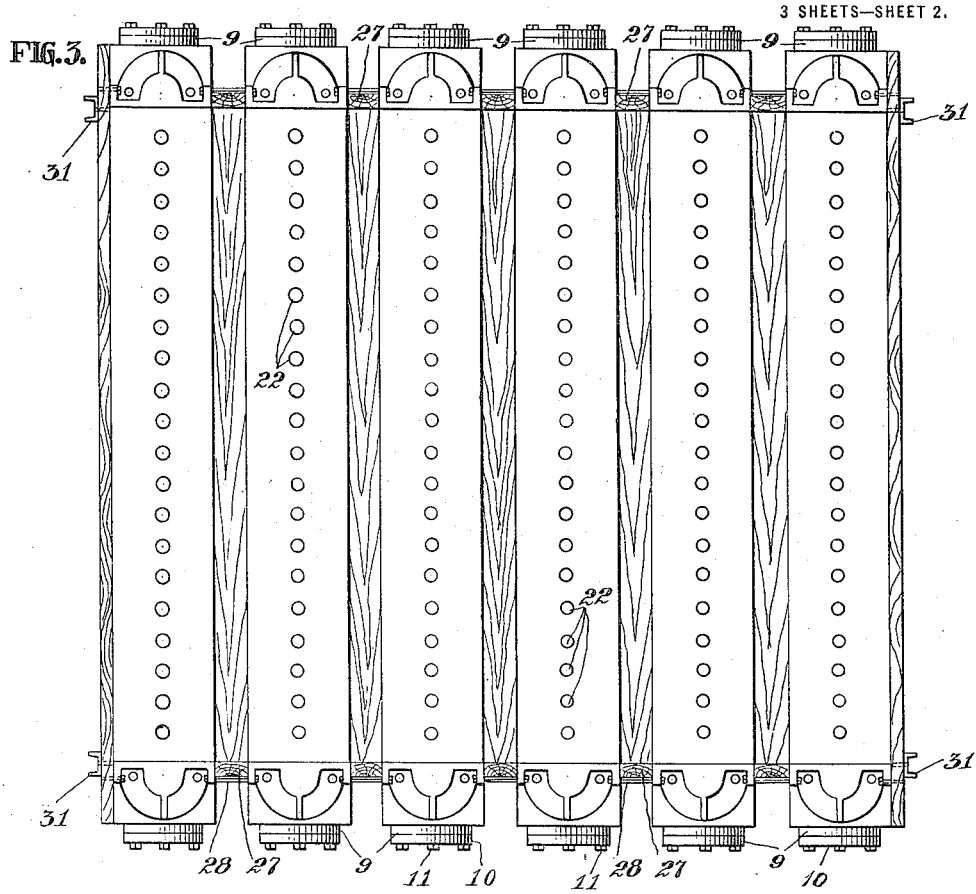
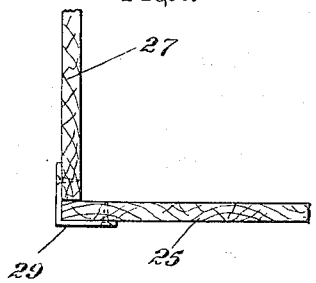

E. E. GAINER.
ICE MAKING APPARATUS.
APPLICATION FILED JUNE 13, 1912. RENEWED SEPT. 12, 1914.
1,157,623.
Patented Oct. 19, 1915.
3 SHEETS—SHEET 3.
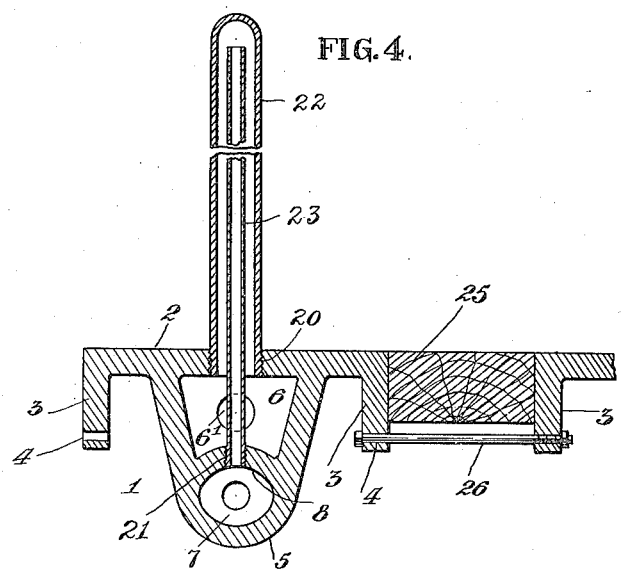
FIG. 4.
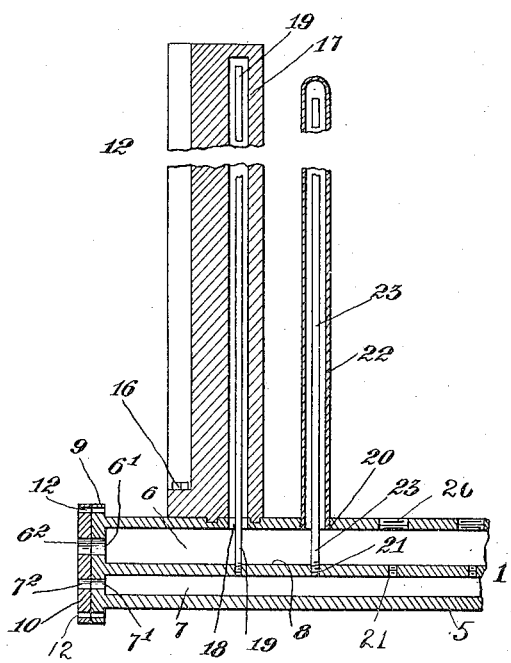
FIG. 5.
FIG. 6.
Witnesses:
C. S. Ashley
J. J. Donohue
Inventor
Edward Earl Gainer
By his Attorney
Edward C. Davidson

UNITED STATES PATENT OFFICE.

EDWARD EARLE GAINER, OF NEW YORK, N. Y., ASSIGNOR TO THE CENTERFREZE ICE PROCESS COMPANY, OF NEW YORK, N. Y., A CORPORATION OF ARIZONA.

ICE-MAKING APPARATUS.

1,157,623.     Specification of Letters Patent.     Patented Oct. 19, 1915.

Application filed June 13, 1912, Serial No. 703,376. Renewed September 12, 1914. Serial No. 861,472.

*To all whom it may concern:*

Be it known that I, EDWARD EARLE GAINER, a citizen of the United States of America, residing in the borough of Manhattan, city, county, and State of New York, have invented a certain new and useful Improvement in Ice-Making Apparatus, of which the following is a specification.

This invention relates to ice making apparatus of the kind disclosed in U. S. Patent of Havenstrite No. 941414 granted November 30, 1909 in respect to the general arrangement of the freezing pipes or members which are supported at their bottoms and stand vertically in the freezing tank, the organization being such that when the ice cake is formed it may be released by passing a thawing medium through the freezing pipes and then be lifted therefrom without in any way disturbing or disconnecting any part of the plate freezing devices.

According to the present invention, the apparatus is so designed and arranged as that each freezing member comprising a header and freezing pipes projecting vertically therefrom constitutes a unit and a plurality of such units, as many as may be desired, may be bolted together with intervening horizontal non-metallic bottom space pieces and like vertical side space pieces thereby forming a bottom and front and rear walls of a freezing tank to which end walls are secured.

Figure 1:
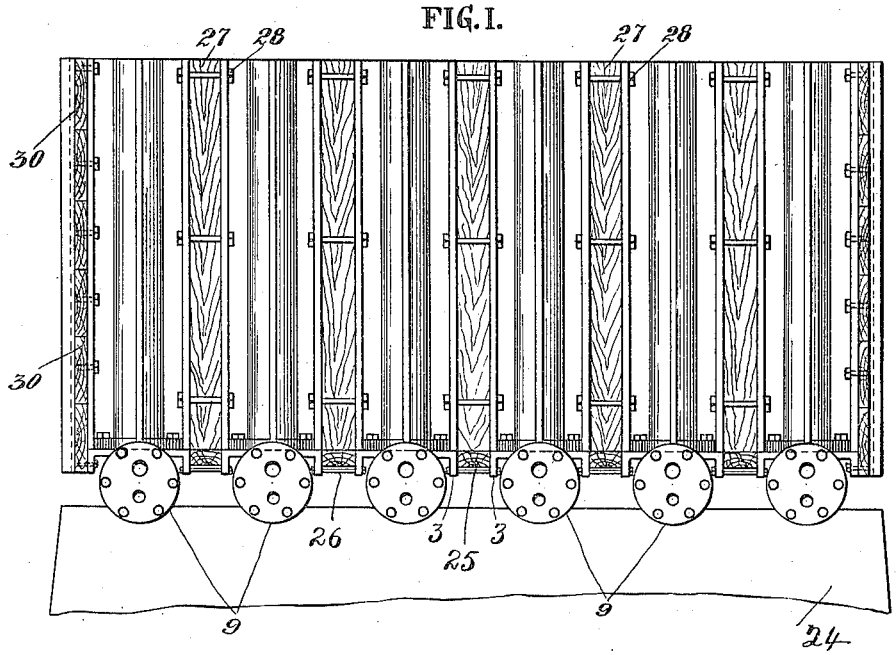
Figure 2:
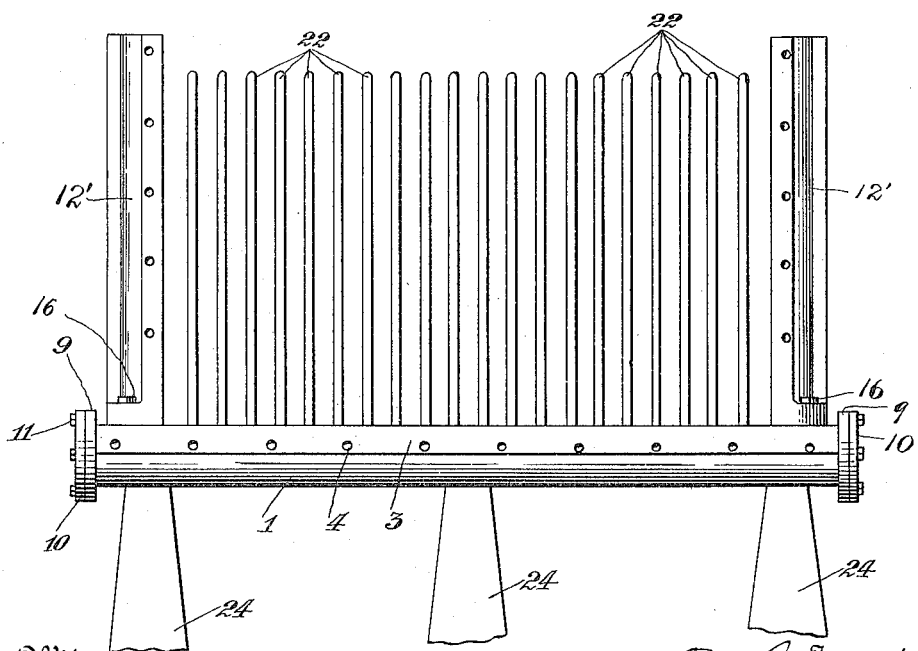

In the accompanying drawing: Figure 1 is a front elevation: Fig. 2, a side elevation of one of the freezing members or units: Fig. 3, a plan view: Fig. 4, a transverse section through one of the headers and one of the bottom spacing pieces: Fig. 5, a vertical longitudinal section through the end portion of one of the headers: Fig. 6, a horizontal section through one of the freeze-plates that form the ends of the freezing members: and Fig. 7, a detail view showing the contiguous ends of a bottom and side spacer secured by a right angle clamp.

Each freezing unit comprises a horizontal header 1 of metal such as cast steel or other metal or composition of metal. The upper face 2 is flat and horizontal and forms part of the floor of the freezing tank. At each edge it has flanges 3 extending downward at right angles to the floor and formed with a plurality of opposite transverse bolt apertures 4. Between the flanges, the header is formed with a downwardly extending horizontal portion 5 formed with two passage ways 6, 7, one above the other and separated by a horizontal wall 8. At each end there is a circular head 9 formed on the part 5 of the header and having an aperture 6′ communicating with a chamber or passage 6 and an aperture 7′ communicating with the lower chamber or passage 7. Upon each head 9 is fitted and secured a plate 10 having apertures $6^2$, $7^2$, coinciding with the apertures 6′, 7′. The head 9 and plate 10 are securely drawn together by bolts 11 passing through co-inciding apertures 12. Adjacent each end of the header is erected a vertical end freezing plate 12′ having a flat vertical inner face 13 forming a portion of the inner face of the side of the tank. A cross section of this end freezing plate is seen in Fig. 6. It has at the bottom a flange 14 with bolt holes 15 by which it is screwed to the face 2 of the header as appears clearly in the various figures by screw bolts 16. It also has side flanges 14′ whose outer faces are at right angles to the surface 13 of the plate and which are provided with bolt holes $14^2$ placed at suitable intervals vertically. In the end freezing plate is a vertical opening 17 that at the bottom communicates with an opening 18 through the face 2 of the header into chamber 6. The opening 17 extends upwardly within the freezing plate to adjacent its upper end. Concentric with the opening 17 there is an aperture tapped through the wall 8 to receive the threaded end of a pipe 19 that opens at the bottom to the chamber 7 and at the top to the passage 17 adjacent its upper end. A refrigerating fluid medium of whatever character introduced to chamber 7 by way of apertures $7^2$, 7′, will pass upwardly through pipe 19 and downwardly around said pipe through passage 17 into chamber 6 thence through the apertures 6′, $6^2$. At suitable intervals between the end freezing plates there are tapped in the top face of the header apertures 20 and concentric apertures in the wall 8. The apertures 20 receive the open threaded ends of freezing pipes 22 closed at the top and the apertures 21 receive the open threaded ends of pipes 23 disposed within the outer pipes 22 and opening at their upper ends adjacent the closed tops of the pipes 22. The introduced refrigerating medium passes up pipes 23 and down pipes 22 to the chamber 6. Such is the construction of a freezing unit. Any desired number of them may be assembled in the formation of a freezing tank in the following manner: Spaced supporting piers or walls 24 erected upon a suitable foundation receive and support the headers. Between contiguous flanges 3 of adjacent headers are placed non-metallic spacers 25 clamped between the flanges 3, 3, by bolts 26 and forming, with the faces 2 of the headers, the floor of the tank. Similarly, vertical spacers 27 are placed between adjacent vertical flanges 14' of the end freezing plates and clamped by bolts 28. Such spacers together with the faces 13 of the freezing plates form the side walls of the freezing tank. The joint between corresponding side spacers 27 and bottom spacers 25 may be made in any suitable manner. As shown in Figs. 1 and 7, the side spacers 27 seat upon the upper faces of the bottom spacers 25 and an iron right angle clamp 29 is applied to hold them together. It is now only necessary to construct the end walls to complete the water-containing or freezing tank. This may be done by planks 30 butt-jointed and bolted to the flanges 14' of the end freezing plates of the end headers; and to further hold this end boarding, channel or other iron braces 31 may be applied. The horizontal and vertical spacers and the end walls are non-metallic and may all be of timber to which the ice cake will not adhere and beyond the margins of which it will not extend. The refrigerating medium is to be properly introduced by suitable connections made at the aperture 7² and after extraction of heat from the water, or after expansion, is taken away by suitable connections applied to the apertures 6².

The headers may be constructed of cast metal in one piece or each may be composed of two or more castings flanged and bolted together. Should there be any leakage from the tank, the leakage water passes away to the space or pit in which the supporting walls or columns are located and there is no danger of ice formation from the leakage water that might tend to disrupt any of the parts or joints.

The system permits of the addition of units to meet the requirements of growing manufacture. The construction is inexpensive. It has many advantages from an engineering point of view considering the erection and operation of such a plant. When the ice cake or cakes have been formed a thawing medium may be passed through the system to release the cakes which then may be grappled and hoisted from the tank. Any suitable thawing medium may be employed. It may be brine or expanded gas or a special thawing medium, depending upon the system under which the plant is operated and the desires or convenience of the operator.

I claim—

1. Ice making apparatus comprising a header having end freezing plates and between the freezing plates a plurality of upwardly extending vertical pipes for circulation of a freezing medium.

2. Ice making apparatus comprising horizontal headers each having on its sides horizontal flanges and at its ends vertical freezing plates with vertical flanges whereby a plurality of such units may be assembled in tank formation by the use of vertical and horizontal spacers.

3. Ice making apparatus comprising a plurality of ice plate forming units each unit being composed of a header the upper face of which constitutes part of the floor of a tank, vertically disposed freezing members extending up from said face of the header, said members being adapted for circulation of a freezing medium, each header having at its sides downwardly extending vertical flanges and vertical members mounted upon each header adjacent its ends and having outwardly extending flanges whereby a plurality of units may be joined in a tank construction with horizontal spacers forming with the headers the floor of the tank and with vertical spacers forming with the vertical members at the ends of the headers the side walls of the tank.

4. Ice making apparatus comprising the combination of a horizontal header having passages 6, 7, and end freezing plates erected on the header adjacent the respective ends thereof and each having a vertical passage open at the bottom and there in communication with chamber 6 and within the same a pipe open at the top and at the bottom communicating with passage 7.

5. Ice making apparatus comprising the combination of a horizontal header having passages 6, 7, and end freezing plates erected on the header adjacent the respective ends thereof and each having a vertical passage open at the bottom and there in communication with chamber 6 and within the same a pipe open at the top and at the bottom communicating with passage 7, and also having vertical side flanges 14'.

6. Ice making apparatus comprising the combination of a horizontal header having side flanges 3 and passages 6, 7, and end freezing plates erected on the header adjacent the respective ends thereof and each having a vertical passage open at the bottom and there in communication with chamber 6 and within the same a pipe open at the top and at the bottom communicating with passage 7, and also having vertical side flanges 14'.

In testimony whereof, I have hereunto subscribed my name.

EDWARD EARLE GAINER.

Witnesses:
LAURA E. SMITH,
L. T. BROWNING.

Copies of this patent may be obtained for five cents each, by addressing the "Commissioner of Patents, Washington, D. C."